United States Patent [19]
Lorz et al.

[11] 3,873,719
[45] Mar. 25, 1975

[54] METHOD OF IMPROVING BEEF PRODUCTION

[75] Inventors: Emil Lorz, Springfield; Leicester T. Spence, Clever, both of Mo.

[73] Assignee: Syntex (U.S.A.) Inc., Palo Alto, Calif.

[22] Filed: Feb. 12, 1973
(Under Rule 47)

[21] Appl. No.: 331,853

[52] U.S. Cl................................. 424/312, 424/329
[51] Int. Cl............................................. A61k 27/00
[58] Field of Search............................ 424/312, 329

[56] References Cited
UNITED STATES PATENTS 2,774,759  12/1956  Blackett et al..................... 260/251
2,970,911  2/1961  Lorz..................................... 426/72

OTHER PUBLICATIONS

Gorodetskii, Chem. Abst., Vol. 63, (1965) page 3381c.

*Primary Examiner*—Sam Rosen
*Attorney, Agent, or Firm*—Lawrence S. Squires; William B. Walker

[57] ABSTRACT

Method for increasing weight gain in cattle while maintaining or improving feed conversion and also a method of improving the quality of meat obtained from cattle. The methods are characterized by administering from 20 to 100 grams of a choline stearate composition, equivalent to from 5 to 25 grams of choline, per day per animal to cattle.

7 Claims, No Drawings

3,873,719

METHOD OF IMPROVING BEEF PRODUCTION

BACKGROUND OF THE INVENTION

1. The Invention

This invention relates to a method and cattle feed supplement for increasing the weight of cattle. In a further aspect this invention relates to a method and cattle feed supplement for improving the quality or grade of meat obtained from cattle. In a still further aspect this invention relates to a method of increasing the weight of beef cattle and quality of meat obtained therefrom, with an improved feed conversion ratio.

2. The Prior Art

In producing beef, it is particularly desirable to obtain the greatest weight gain in as short period of time as possible. It is also desirable to obtain as an effective utilization of feed with respect to weight gain, as possible. Typically, the relative utilization of feed is expressed as the ratio of feed consumed per pound of weight gain, thus it is desirable to have a low feed ratio. Another primary consideration is the grade or quality of meat obtained from the slaughtered animal. Thus, it is desirable that the grade of meat, obtained from the slaughtered animal, be as high as practical. Accordingly, we have now discovered by administering a controlled amount of a choline stearate composition per day to calves or yound cattle, that we are able to obtain an increase in both weight gain and the quality of meat obtained from the slaughtered animal over what normally would be obtained while maintaining or improving the utilization of feed or feed ratio.

Choline and choline salts have long been used as animal feed supplements in small quantites to correct vitamin deficiencies, patticularly with particularly to liver malfunctions and the prevention of perosis in poultry. Also, in co-inventor Lorz's previous U.S. Pat. No. 2,970,911, a process for increasing the weight of animals, althourg primarily directed at poultry, is disclosed. In that process the animal is fed a mixture containing a major portion of fat and a minor portion of fatty acid salts of choline. The purpose of the choline salts in the fat mixture is to enhance the assimilation of the fat portion of the mixture and the use of fatty acid salts of choline in preference to other choline salts is merely to facilitate the intimate dispersion of choline within the fat. In contrast to this, we now have discovered that by feeding a quantity of choline stearate to cattle, controlled within relatively narrow limits, that we can improve the rate of weight gain, and/or quality of meat while maintaing or improving feed conversion.

SUMMARY OF THE INVENTION

In summary, the process of our invention comprises administering to cattle weighing about from 60 to 1200 pounds about from 20 to 100 grams of choline stearate composition equivalent to 5 to 25 grams of choline per day per animal.

In summary, the choline stearate composition can be essentially pure choline stearate or it can also contain up to 50%, by weight, of other choline salts of fatty acids having from 14 to 22 carbon atoms. Typically, the choline stearate compositions applied in our invention are mixtures of choline salts of fatty acids containing from 14 to 22 carbon atoms, approximately 90% wt. of which is made up of stearic and palmitic acids while the remaining 10% consists of other fatty acids having from 14 to 22 carbon atoms and wherein at least 50% wt. of the total choline stearate composition is choline stearate.

The invention will be further described herein below.

FURTHER DESCRIPTION OF THE INVENTION AND PREFERRED EMBODIMENTS

Considering our invention in greater detail, the choline stearate composition, used in the process of our invention, is essentially composed of about from 50 to 100%, by wt., choline stearate and about from 0 to 50%, by wt., of one or more choline salt of fatty acids having from 14 to 22 carbon atoms. As can be seen from the above definition, the choline stearate composition can be essentially pure choline stearate or it can be a mixture containing at least 50% choline stearate in mixture with other choline salts of fatty acids having from 14 to 22 carbon atoms. We have further found that very good results are obtained in our process by employing a choline stearate composition essentially composed of about from 50 to 100%, by wt., choline stearate; 0 to 50%, by wt., choline palmitate and 0 to 10%, by wt., of one or more choline salts of fatty acids having from 14 to 22 carbon atoms. This composition can be conveniently prepared by using U.S.P. stearic acid in the general synthesis described herein below.

Choline stearate is a known salt and can be prepared according to known procedures such as, for example, described in U.S. Pat. No. 2,774,759, by reacting an aqueous solution of trimethylamine with ethylene oxide and then reacting the resulting aqueous solution with stearic acid or the desired stearic acid-fatty acid mixture, e.g. U.S.P. stearic acid. The resulting product will have essentially the same molecular ratio of choline stearate to the other fatty acid choline salts as the molecular ratio of the corresponding acids in the starting material. Further, since the commercial grades of stearic acid (e.g. U.S.P. stearic acid) are typically mixtures of at least 50% stearic acid in mixture with other fatty acids having from 14 to 22 carbon atoms, it is commercially more desirable and more convenient to employ a mixture of the fatty acid choline salts in preference to pure choline stearate.

The process of our invention for increasing weight gain and/or the quality of beef while maintaing or improving feed ratio can be effected by administering, preferably orally, to cattle, weighing about from 60 to 1200 lbs, about from 20 to 100 grams of the choline stearate composition, defined above, per day per animal. Based on choline content, this corresponds to a choline range of about from 5 to 25 grams. The 20 to 100 grams of the choline stearate composition per day per animal dosage range is critical, since dosage ranges below the prescribed range fail to produce a statistically significant increase in daily weight gain and dosage ranges above the prescribed range fail to afford any economic advantage in daily weight gain, feed conversion or meat quality over the prescribed range. We have further found that best results are obtained by administering, preferably orally, about from 40 to 80 grams of the choline stearate compostion per animal per day. Based on choline content, this corresponds to a choline dosage range of about from 10 to 20 grams of choline.

The choline stearate composition can be administered in its pure solid form, or dispersed on a suitable solid nontoxic diluent or carrier or as a liquid dissolved in a suitable non-toxic solvent or as an emulsion in a suitable liquid carrierr. Typically, and conveniently, the choline stearate composition is orally administered to the cattle, as a feed supplement dispersed upon a suitable solid particulate diluent. The feed supplement can then be simply fed to the cattle, either mixed with the usual feed ration, or as a separate feed ration. Suitable diluents which can be used include, for example, corn flour, ground corn cob, hominy, corn gluten meal, wheat middling, soybean meal, soybean mill feed, rice mill by-product, and the like, and mixtures thereof. Further, based on handling characteristics, we have found that a feed supplement containing about from 10 to 65%, by wt., of the choline stearate compostion is prefered and that ground corn cob is the preferred diluent. The feed supplement can also contain other compatible nutrients and vitamins in combination with the choline stearate composition.

The above choline stearate feed supplement can be conveniently prepared by dissolving stearic acid or the desired stearic acid-fatty acid mixture, e.g. U.S.P. stearic acid, in a suitable solvent, e.g. methanol, ethanol, and the like, and then treating the resulting solution first with a triethylamine salt, and then ethylene oxide, at temperatures in the range of about from 10° to 50°C for about from 2 to 6 hours. The resulting reaction product, containing the corresponding choline stearate composition in solution, can then be dried by removal of the alcohol by vacuum to give a dry waxy solid of choline stearate or the solution may be sprayed directly on the carrier and the solvent evaporated.

The choline stearate composition can also be administered parenterally, in a form suitable for such administration. However, such methods are uneconomical and frequently produce secondary problems related to parenteral administration.

The invention is further illustrated by the follwoing non-limiting examples illustrating the preparation of the choline stearate composition and feed supplement. Also as used herein above and below, the term % or percent refers to weight percent.

EXAMPLE 1

Preparation of Choline Stearate

266 G. of methyl alcohol is placed in a one liter flask fitted with a thermometer, reflux condenser and agitator. 266 G. (1 mole) of stearic acid is added to the alcohol and a slow stream of gaseous trimethylamine is introduced into the mixture with gentle agitation. The temperature of the mixture drops to 10°C and the flask and contents are then warmed to 20°C and maintained at this temperature while 59 g. (1 mole) of trimethylamine are added over a peroid of 30 minutes. The reaction is then stirred for 1 hour resulting in the formation of trimethylamine stearate mixture.

46 G. (1 mole + 2 g. excess) of gaseous ethylene oxide is then introduced below the surface of the trimethylamine stearate liquid over a period of 2 hours maintaining the temperature between 20°–50°C by external cooling. The reaction mixture is then stirred for 1 hour longer to complete the reaction. The resulting choline stearate solution is evaporated in vaccum at 50°C to remove the alcohol and yields essentially pure choline stearate in quantitative yield.

EXAMPLE 2

Choline Stearate on carrier

In a 1000-gallon reactor are placed 285 gal. of methanol and 1890 lbs. of U.S.P. stearic acid. The stearic acid is neutralized with 422.5 lbs. of trimethylamine as described in Example 1 and the choline stearate prepared by the addition of 312 lbs. of ethylene oxide, observing the conditions as defined in Example 1.

The choline stearate solution is dispersed on 7833 lbs. of ground corn cob carrier by spraying the solution on the carrier, contained in a spray dryer and the methanol simultaneously removed by vacuum distillation at 50°C, yielding a material containing 25% choline stearate equivalent to about 6.25% choline.

EXAMPLE 3

In a manner described in Example 1, 1890 lbs. of commercial stearic acid were reacted with 422.5 lbs. of trimethylamine and 312 lbs. of ethylene oxide to give a methanolic solution containing 2611 lbs. choline stearate. This solution was sprayed on to 2611 lbs. of ground corn cobs contained in a spray dryer evacuated and heated to 50°C. After a period of 6–8 hours, the material contains less than 2% volatiles and contains approximately 50% choline stearate equivalent to 12.5% choline.

Obviously many modifications and variations of the invention, described herein above and below in the Claims, can be made without departing from the essence and scope thereof.

What is claimed is:

1. A method for improving beef quality of cattle weighing about from 60 to 1200 pounds, which comprises administering to said cattle about from 20 to 100 grams per day per animal of a choline stearate containing composition consisting essentially of about from 50 to 100%, by wt., choline stearate and 0 to 50%, by wt., of a fatty acid salt of choline selected from the group of the salts of choline with fatty acids having from 14 to 22 carbon atoms and mixtures of such salts.

2. The method of claim 1 wherein said choline stearate containing composition is administered orally.

3. The method of claim 2 wherein said choline stearate containing composition consist essentially of about from 50 to 100%, by wt., choline stearate; 0 to 50%, by wt., choline palmitate and 0 to 10%, by wt., of said fatty acid salts of choline.

4. The method of claim 2 wherein said choline stearate containing composition is essentially pure choline stearate.

5. The method of claim 2 wherein said choline stearate containing composition is administered as a feed supplement comprising said choline stearate composition dispersed on a solid particulate non-toxic diluent.

6. The method of claim 5 wherein said diluent is selected from the group of corn flour, hominy, corn gluten meal, ground corn cob, wheat middlings, soybean meal, soybean mill feed, rice mill by-product and mixtures thereof.

7. The method of claim 2 wherein said cattle are orally administered about from 40 to 80 grams per day per animal of said choline stearate containing composition.

* * * * *